United States Patent [19]

Fujisaki et al.

[11] Patent Number: 5,058,246
[45] Date of Patent: Oct. 22, 1991

[54] SLIDE FASTENER ELEMENTS MADE OF HELICALLY WOUND MONOFILAMENT AND METHOD OF FORMING THE SAME

[75] Inventors: Yoshinori Fujisaki; Sakae Aimono, both of Toyama, Japan

[73] Assignee: Yoshida Kogyo K. K., Tokyo, Japan

[21] Appl. No.: 635,913

[22] Filed: Dec. 28, 1990

[30] Foreign Application Priority Data

Dec. 29, 1989 [JP] Japan .................................. 1-342756

[51] Int. Cl.⁵ ............................................. A44B 19/40
[52] U.S. Cl. ........................................ 24/394; 24/391
[58] Field of Search ................. 24/394, 391, 395, 381, 24/575

[56] References Cited

U.S. PATENT DOCUMENTS

| | | | |
|---|---|---|---|
| 3,047,923 | 8/1962 | Wilcken | 24/391 |
| 3,057,030 | 10/1962 | Claus | 24/391 |
| 3,337,928 | 8/1967 | Glindmeyer | 24/394 |
| 3,989,300 | 2/1991 | Fukuroi | 24/391 |

*Primary Examiner*—Victor N. Sakran
*Attorney, Agent, or Firm*—Hill, Van Santen, Steadman & Simpson

[57] ABSTRACT

Slide fastener elements made of a helically wound synthetic resin monofilament and the method of forming the same. According to a preferred embodiment, each fastener element comprises an interengaging head arranged on one-line in the longitudinal direction of the slide fastener elements, a pair of interengaging head-side widened portions formed at the both sides of the interengaging head, upper and lower legs extending from the both ends of the interengaging head through the pair of interengaging head-side widened portions respectively so as to transverse the longitudinal direction of the slide fastener elements and a turn extending between an upper leg of one slide fastener element and a lower leg of an adjacent slide fastener element through a pair of connecting portions formed at the both sides of the turn. The interengaging head is formed by pressing the monofilament to be sidened at its portion corresponding to the interengaging head. The interengaging head-side widened portions and the connecting portions are formed by pressing the monofilament to be widened adjacent to the head and the turn respectively and used as the bending portions of the monofilament into the slide fastener elements made of the helically wound monofilament.

6 Claims, 4 Drawing Sheets

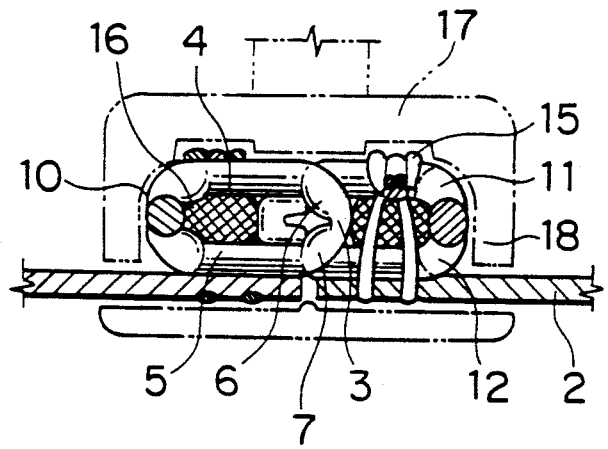
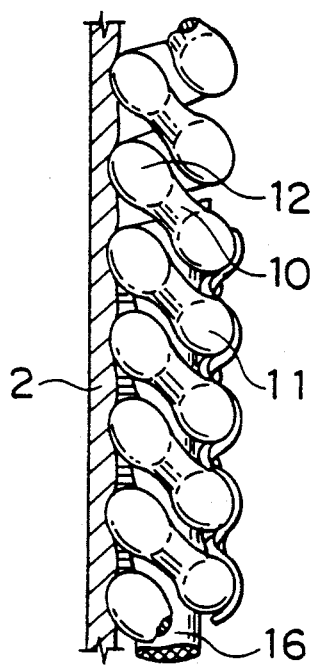
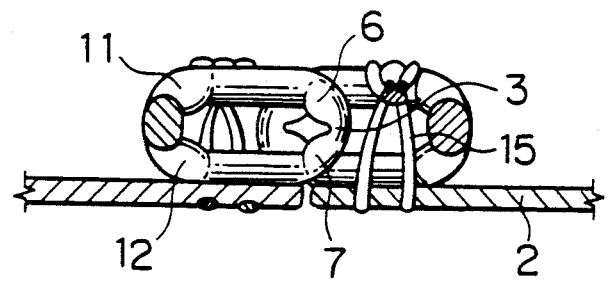
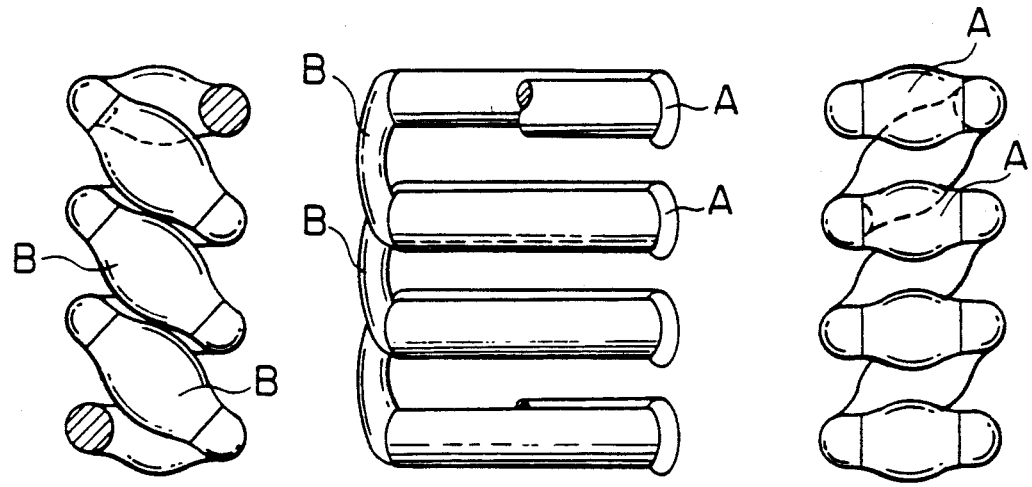

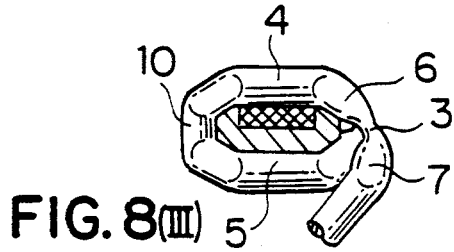
FIG. 8(III)

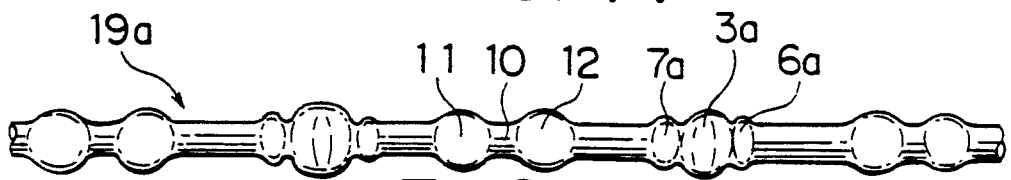
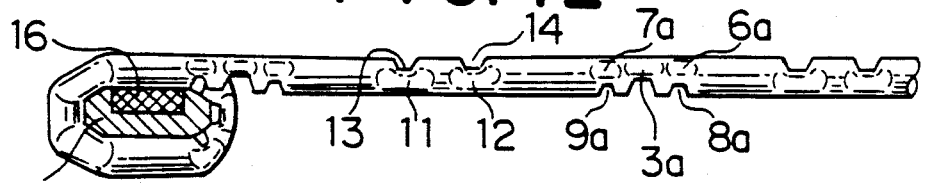
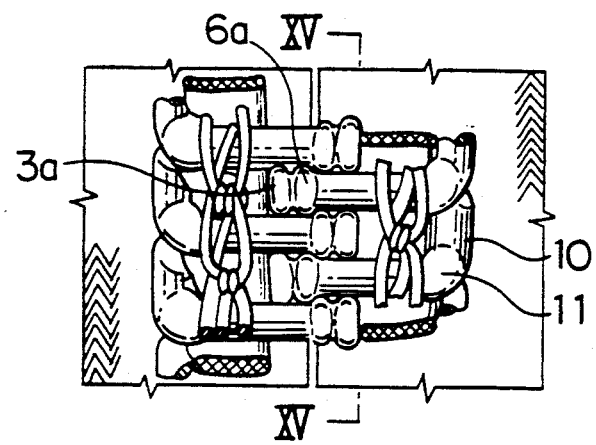
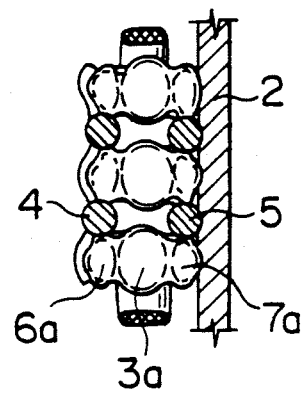
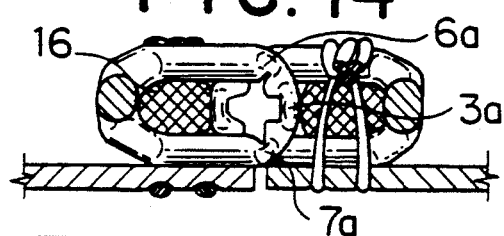
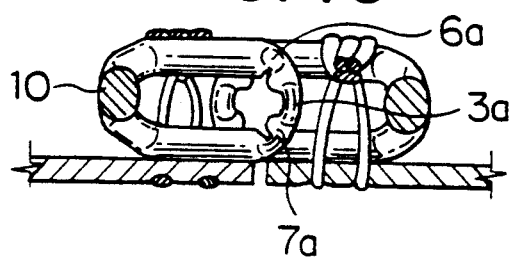
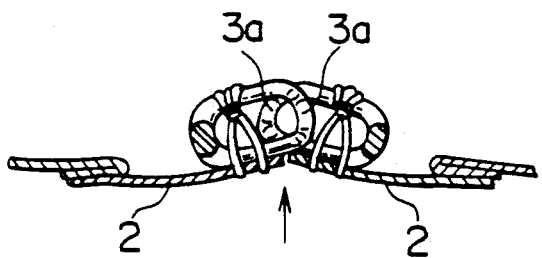

SLIDE FASTENER ELEMENTS MADE OF HELICALLY WOUND MONOFILAMENT AND METHOD OF FORMING THE SAME

BACKGROUND OF THE INVENTION

1. Field of the Invention

This invention relates to slide fastener elements, which is made of a helically wound synthetic resin monofilament and which has basically interengaging heads and turns, and relates to the method of forming the above mentioned slide fastener elements.

2. Prior Art

In prior art, for example, in U.S. Pat. No. 3,057,030, as shown in FIG. 18, slide fastener elements made of a helically wound synthetic resin monofilament are formed by pressing a monofilament at suitable intervals in order to form widened portions. Then, this pressed monofilament is wound helically, while the widened portions are used as bending portions to be interengaging heads A and turns B.

However, in these slide fastener elements, the interengaging heads A and turns B of the slide fastener elements are formed by pressing the monofilament from the both upper and lower sides, further, they are provided in planes perpendicular to fastener tapes of a slide fastener chain respectively at the bending portions. Therefore, during the slide fastener chain is formed or used, the bending portions are often disarranged from their precise locations and the cross section of the slide fastener elements is often deformed. As a result, the slide fastener elements can not keep precise interengagement surely.

SUMMARY OF THE INVENTION

Hereinafter, "slide fastener elements made of a helically wound monofilament" will be sometimes expressed by "coil-shaped slide fastener elements".

It is the object of the present invention to provide coil-shaped slide fastener elements, which are made of a synthetic resin material, the bending portions of which can be arranged correctly and the cross section of which are not deformed so that the opposed pair of coil-shaped slide fastener elements can be interengaged each other precisely and surely. It is another object of the present invention to provide the method by which the above mentioned coil-shaped slide fastener elements can be formed at the high-speed.

Coil-shaped slide fastener elements related to the present invention are made of synthetic resin monofilament. Each slide fastener element comprises an interengaging head, a pair of interengaging head-side widened portions, upper and lower legs, a turn and a pair of connecting portions.

The interengaging head is formed to be arranged on one-line in the longitudinal direction of the slide fastener elements.

The pair of interengaging head-side widened portions are formed at the both upper and lower sides of the interengaging head respectively.

The upper and lower legs extend from the both ends of the interengaging head through the pair of interengaging head-side widened portions respectively so as to transverse the longitudinal direction of the slide fastener elements.

The turn extends between an upper leg of one slide fastener element and a lower leg of an adjacent slide fastener element through the pair of connecting portions.

The pair of connecting portions are formed at the both upper and lower sides of the turn respectively.

The interengaging head is formed by pressing the monofilament to be widened at its portions corresponding to the interengaging head. The pair of interengaging head-side widened portions and the pair of connecting portions are formed by pressing the monofilament to be widened at its portions adjacent to the interengaging head and the turn respectively.

The monofilament is bent at the pair of interengaging head-side widened portions and the pair of connecting portions. Since they are formed by pressing the monofilament so as to be widened, the bending portions are determined correctly. Accordingly, the monofilament can be wound precisely and easily. Therefore, the interengaging head can be always arranged on the one-line in the longitudinal direction of the coil-shaped slide fastener elements, thus, opposed pair of coil-shaped slide fastener elements can be interengaged surely. On the other hand, the turns extend between adjacent slide fastener elements obliquely so as to be parallel each other on the side view of the coil-shaped slide fastener elements. Accordingly, the external side faces of the turns are arranged on one-line on the plan view of the coil-shaped slide fastener elements, thus, a slider can be slid smoothly.

While the shape of the interengaging head can be kept exactly, the monofilament is bent at the interengaging head-side widened portions disposed at the both sides of the interengaging head. Accordingly, a predetermined interval between the upper and lower legs can be kept. Therefore, when the opposed pair of coil-shaped slide fastener elements are interengaged, a portion of the interengaging head of one coil-shaped slide fastener element can be engaged surely between the upper and lower legs of the other coil-shaped slide fastener element. At the same time, the interengaging head-side widened portions of the opposed pair of coil-shaped slide fastener elements can be interengaged deeply until that turn-side faces of the opposed interengaging head-side widened portions are brought into contact with each other.

On the other hand, the pair of connecting portions prevent sewing threads from slipping from the legs, thereby the attaching direction of the coil-shaped slide fastener elements can be kept exactly.

As a result, the cross section of the coil-shaped slide fastener elements are not deformed and predetermined pitches of the coil-shaped slide fastener elements can be kept for the stable and precise interengagement of the opposed pair of coil-shaped slide fastener elements.

According to the present invention, a method of forming the coil-shaped slide fastener elements made of the synthetic resin monofilament is also provided.

In this method, the monofilament is pressed to be widened at its portions corresponding to each interengaging head which is arranged on one-line in the longitudinal direction of the coil-shaped slide fastener elements. Further, the monofilament is pressed to be widened at its portions adjacent to the interengaging head and the turn to form the pair of interengaging head-side widened portions and the pair of connecting portions respectively. The pair of interengaging head-side widened portions are disposed between the interengaging head and the pair of upper and lower legs respectively. The pair of connecting portions are disposed between the turn and the pair of upper and lower legs respectively.

Then, the monofilament is wound helically, while the monofilament is bent at the pair of interengaging head-side widened portions and the pair of connecting portions.

Due to the interengaging head-side widened portions and the connecting portions, the monofilament can be bent easily and correctly. Consequently, the coil-shaped slide fastener elements can be formed at the high-speed.

Further objects and advantages of the present invention will be apparent from the following description, reference being had to the accompanying drawing wherein preferred embodiments of the present invention are clearly shown.

BRIEF DESCRIPTION OF THE DRAWINGS

FIG. 4 is a cross sectional view of an opposed pair of interengaging coil-shaped slide fastener elements;

FIG. 5 is a side view of turns of FIG. 2;

FIG. 6 is a cross sectional view of an opposed pair of interengaging coil-shaped slide fastener elements where core cord is not threaded;

FIG. 11 is a plan view of a monofilament which is pressed partially in second embodiment;

FIG. 12 is an illustration showing operation of winding a monofilament around a mandrel in second embodiment;

FIG. 13 is a plan view of an opposed pair of interengaging coil-shaped slide fastener elements attached to an opposed pair of fastener tapes respectively in second embodiment;

FIG. 14 is a cross sectional view of an opposed pair of interengaging coil-shaped slide fastener elements in second embodiment;

FIG. 15 is a section taken on line XV—XV in FIG. 13;

FIG. 16 is a cross sectional view of an opposed pair of interengaging coil-shaped slide fastener elements where core cord is not threaded in second embodiment;

FIG. 17 is an illustration showing operation suppressing disengagement of coil-shaped slide fastener elements with interengaging head-side widened portions in second embodiment;

FIG. 18 shows plan view and side views of conventional coil-shaped slide fastener elements.

DESCRIPTION OF THE PREFERRED EMBODIMENT

Figure 1:
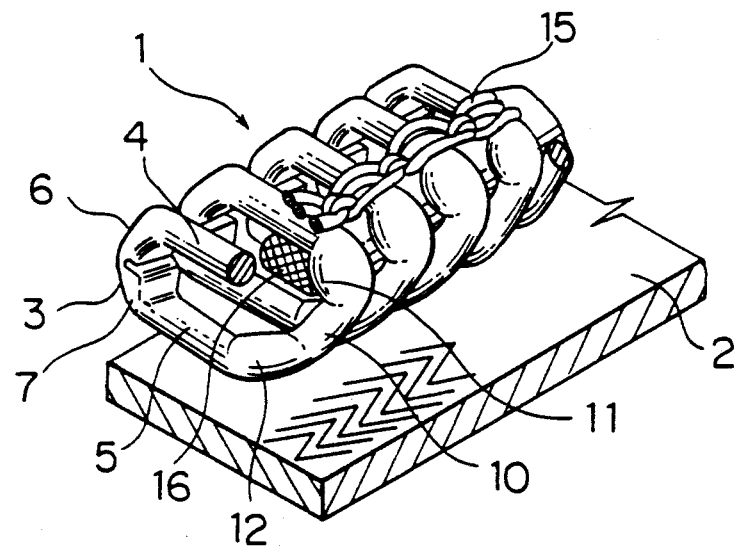
FIG. 1 is a perspective view of coil-shaped slide fastener elements attached to a fastener tape related to the present invention.

Now, the present invention is described referring to the drawings.

As shown in FIG. 1, slide fastener elements 1 of the present invention is made of a helically wound monofilament 19 made of thermoplastic synthetic resin such as polyamide, polyester and the like. In each coil-shaped slide fastener element, an interengaging head 3, a pair of interengaging head-side widened portions 6, 7, upper and lower legs 4, 5, a turn 10 and a pair of connecting portions 11, 12 are provided.

Figure 2:
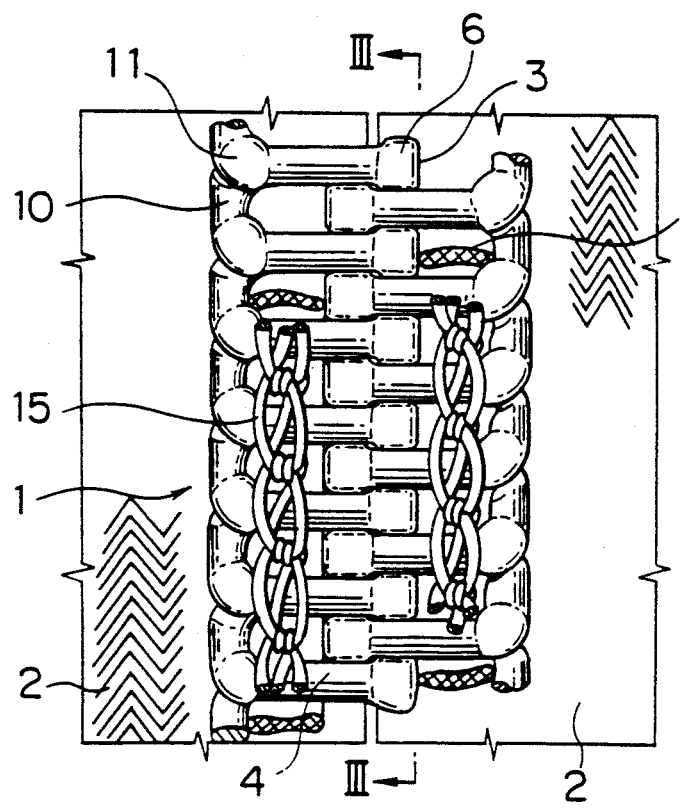
FIG. 2 is a plan view of an opposed pair of interengaging coil-shaped slide fastener elements attached to an opposed pair of fastener tapes respectively.
Figure 3:
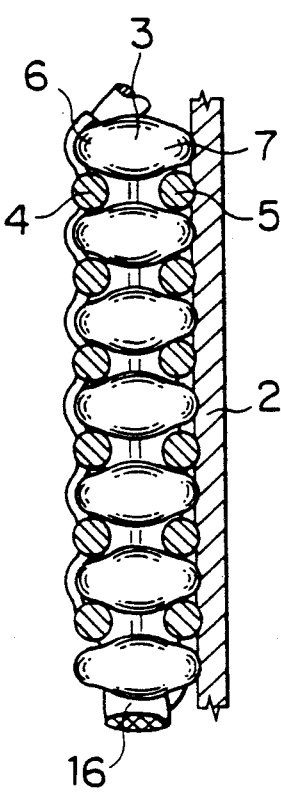
FIG. 3 is a section taken on line III—III in FIG. 2.

As shown in FIGS. 2 and 3, the interengaging head 3 is always arranged on one-line in the longitudinal direction of the slide fastener elements 1. Then, as shown in FIGS. 7 and 8, the interengaging head 3 is formed by pressing the monofilament 19 having, for example, circular cross section at its portion corresponding to the interengaging head 3 from the upper side in FIG. 8, with a small width of the vertical direction to the longitudinal direction of the monofilament 19 so as to be projected transversely and widened.

Figure 7:
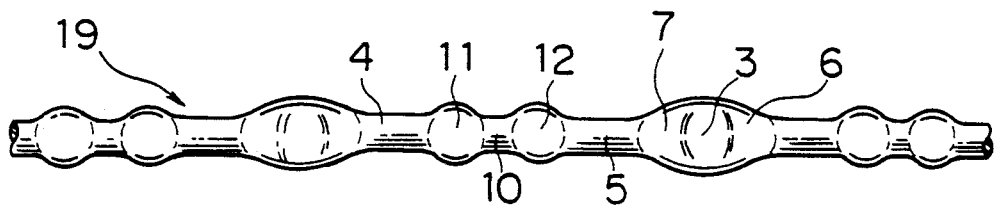
FIG. 7 is a plan view of a monofilament which is pressed partially.
Figure 8I:
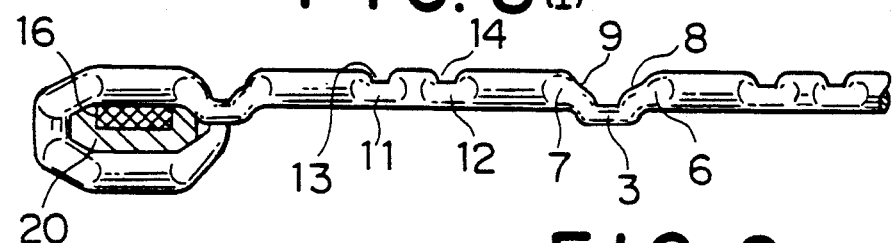
FIGS. 8-i~8-v are illustrations showing one by one operation for forming coil-shaped slide fastener elements.
Figure 8:
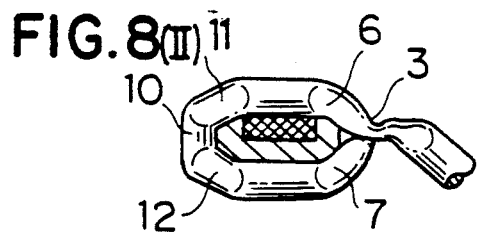

Then, as shown in FIGS. 7 and 8, the pair of interengaging head-side widened portions 6, 7 are formed at the both sides (upper and lower sides in the cross sectional view of the coil-shaped slide fastener element 1) of the interengaging head 3 respectively. Then, the pair of interengaging head-side widened portions 6, 7 are formed by pressing the monofilament 19 at its portions adjacent to the interengaging head 3 from the upper side in FIG. 8 with a small width of the vertical direction to the longitudinal direction of the monofilament 19 so as to be projected transversely. In this case, the interengaging head-side widened portions 6, 7 are formed so as to be smaller than the interengaging head 3. When each pair of interengaging head-side widened portions 6, 7 are formed, each pair of pressed portions 8, 9 are formed naturally at the same time. In this embodiment, each pair of interengaging head-side widened portions 6, 7 are disposed so as to be connected to each interengaging head 3 respectively. Alternatively, as shown in FIG. 11, in second embodiment explained after, each pair of interengaging head-side widened portions 6a, 7a can be disposed so as to be separated from each interengaging head 3a.

As shown in FIG. 1, the turn 10 extends between an upper leg 4 of one slide fastener element and a lower legs 5 of an adjacent slide fastener element through the pair of connecting portions 11, 12 and is made of the monofilament 19 having the original circular cross section being not deformed. Accordingly, the turn 10 extends between adjacent slide fastener elements obliquely so as to be parallel each other on the side view of the coil-shaped slide fastener elements (FIG. 5). Accordingly, the external side faces of the turns are arranged on one-line on the plan view of the coil-shaped slide fastener elements (FIG. 2).

As shown in FIGS. 7 and 8, the pair of connecting portions 11, 12 are formed at the both sides (upper and lower sides in the cross sectional view of the coil-shaped slide fastener element 1) of the turn 10 respectively in the same manner as the above mentioned pair of interengaging head-side widened portions 6, 7; by pressing the monofilament 19 at its portions adjacent to the turn 10 with a small width of the vertical direction to the longitudinal direction of the monofilament 19 so as to be projected transversely. Then, a pair of pressed portions 13, 14 are formed naturally at the same time.

Next, the monofilament 19, which is pressed partially in the above mentioned manner, is wound around a mandrel 20 so as to be the coil-shaped slide fastener elements 1. In this case, the pair of interengaging head-side widened portions 6, 7 and the pair of connecting portions 11, 12 are used as the bending portion of the monofilament 19.

The advantages of the coil-shaped slide fastener elements 1 related to the present invention will be shown clearly as follows;

The pair of interengaging head-side widened portions 6, 7 and the pair of connecting portions 11, 12 are formed by pressing the monofilament 19 so as to be widened, the bending portions can be determined correctly. Accordingly, the monofilament can be wound precisely and easily. Therefore, as shown in FIGS. 1 and 3, the interengaging head 3 can be always arranged on the one-line in the longitudinal direction of the coil-shaped slide fastener elements 1, thus, the opposed pair of coil-shaped slide fastener elements 1, 1 can be interengaged surely. On the other hand, as explained before, as shown in FIG. 2, the external side faces of the turns 10, 10 are arranged on one-line on the plan view of the coil-shaped slide fastener elements, thus, a slider 17 (FIG. 4) can be slid smoothly. Additionally, when the slider 17 is slid, even if complemental forces are applied transversely to the opposed pair of coil-shaped slide fastener elements 1, 1, as shown in FIG. 4, since every turn 10 is brought into contact completely with the inner face of a guide flange 18 of the slider 17, the interengagement of the opposed pair of coil-shaped slide fastener elements 1, 1 can be kept surely.

In winding helically the monofilament 19, while the shape of the interengaging head 3 can be kept exactly, the monofilament 19 is bent at the interengaging head-side widened portions 6, 7 disposed at the both sides of the interengaging head 3. Accordingly, a predetermined interval between the upper and lower legs 4, 5 can be kept. Therefore, when the opposed pair of coil-shaped slide fastener elements 1, 1 are interengaged, a portion of the interengaging head 3 of one coil-shaped slide fastener element can be engaged surely between the upper and lower legs 4, 5 of the other coil-shaped slide fastener element. At the same time, as shown in FIG. 2, the interengaging head-side widened portions 6, 6, 7, 7 of the opposed pair of coil-shaped slide fastener elements 1, 1 can be interengaged deeply until that turn-side faces of the opposed interengaging head-side widened portions 6, 6, 7, 7 are brought into contact with each other.

On the other hand, as shown in FIG. 1, due to the pair of connecting portions 11, 12, sewing threads 15 for attaching the coil-shaped slide fastener elements 1 to a fastener tape 2 can be prevented from slipping from the upper and lower legs 4, 5. Accordingly, even if a pulling force is applied to the opposed pair of coil-shaped slide fastener elements 1, 1 transversely, the attaching direction of the coil-shaped slide fastener elements 1, 1 to the fastener tapes 2, 2 can be kept.

As a result, the cross section of the coil-shaped slide fastener elements 1 is not deformed and predetermined pitches of the coil-shaped slide fastener elements can be kept thereby the interengagement of the opposed pair of coil-shaped slide fastener elements 1, 1 can be ensured precisely and stably.

In the above embodiment, as shown in FIG. 1, a core cord 16 made of fiber is threaded between the upper and lower legs 4, 5. However, FIG. 6 shows the opposed pair of coil-shaped slide fastener elements 1, 1 where the core cord is not threaded. Also in this case, since the coil-shaped slide fastener element has the pair of interengaging head-side widened portions 6, 7 and pair of connecting portions 11, 12, the advantages of the present invention can be obtained sufficiently.

Now, a method of forming the coil-shaped slide fastener elements 1 will be explained. FIGS. 7, 8, 9 and 10 show the forming operation of the coil-shaped slide fastener elements 1. The monofilament 19 is made of the synthetic resin material. As shown in FIG. 7, alternately along the monofilament 19, a number of interengaging heads 3, 3, are formed by pressing the monofilament 19 at its portions corresponding to the interengaging heads 3, 3 and a number of pairs of interengaging head-side widened portions 6, 7, 6, 7 and pairs of connecting portions 11, 12, 11, 12 are formed by pressing the monofilament 19 at its portions adjacent to the interengaging heads 3, 3 and the turns 10, 10 respectively.

Next, as shown in FIG. 8, the monofilament 19 which has been pressed partially is wound around the mandrel 20 having substantially rectangular cross section so as to be the coil-shaped slide fastener elements 1. One pitch of the coil-shaped slide fastener elements 1 is formed in the manner shown in FIGS. 8-*i*~8-*v*. The core cord 16 is put along a trough of the mandrel 20 so as to be threaded between the upper and lower legs 4, 5. Then, as shown in FIG. 8-*i*, the monofilament 19 is wound around the mandrel 20 so that each pressed face of the pressed portions 8, 9, 13, 14 directs outside of the wound monofilament 19.

Since the pair of interengaging head-side widened portions 6, 7 and the pair of connecting portions 11, 12 are formed by pressing the monofilament 19 to be widened, the monofilament 19 can be bent there and wound around the mandrel 20 along its peripheral corners one by one precisely and easily. As a result, the coil-shaped slide fastener elements 1 can be formed at the high-speed.

Further, in this embodiment, as shown in FIG. 8, the monofilament 19 is pressed to be bent so that the interengaging head 3 is deeper than the interengaging head-side widened portions 6, 7. Then, the monofilament 19 is projected toward the opposite side to its pressed surface at the interengaging head 3. Therefore, when the monofilament 19 is wound around the mandrel 20, this projected portion of the interengaging head 3 is pressed toward the mandrel 20. Accordingly, a resiliency is applied to the pair of widened portions 6, 7 so that the predetermined interval between the upper and lower legs 4, 5 can be kept more exactly. Therefore, when the opposed pair of coil-shaped slide fastener elements 1, 1 are interengaged, a portion of the interengaging head 3 of one coil-shaped slide fastener element can be engaged more surely between the upper and lower legs 4, 5 of the other coil-shaped slide fastener element. As a result, the stable interengagement of the opposed pair of coil-shaped slide fastener elements 1, 1 can be ensured.

Figure 9:
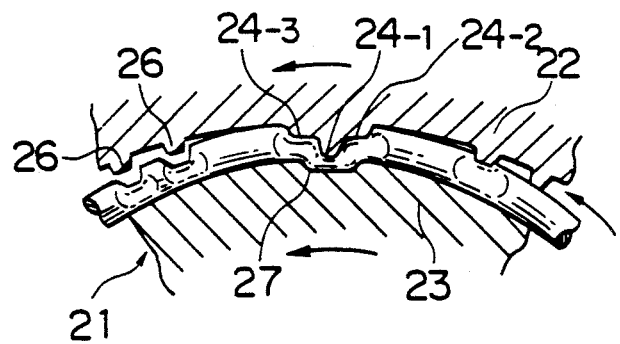
FIG. 9 is a cross sectional view of a stamping roller.
Figure 8:
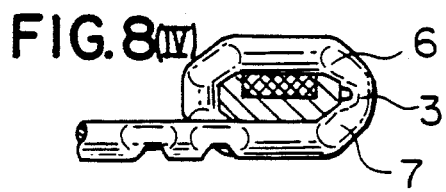

The interengaging head 3 and the pair of interengaging head-side widened portions 6, 7 and the pair of connecting portions 11, 12 are formed by pressing the monofilament 19 with a stamping roller 21. FIG. 9 shows a cross section of the important portion of the stamping roller 21. This roller 21 comprises an external roller 22 and an internal roller 23. The external and internal rollers 21, 22 are rotated with the same peripheral velocity. The monofilament 19 is running continuously according to the rotation of the stamping roller 21. Along the internal peripheral surface of the external roller 22, a number of projections; larger projections 24-1, 24-1, smaller projections 24-2, 24-3, 24-2, 24-3 and projections 26, 26 are provided. The larger projection 24-1 presses the monofilament 19 to form the interengaging head 3. The pair of smaller projections 24-2, 24-3 are disposed to be at the before and behind sides of the larger projection 24-1 in the rotating direction of the stamping roller 21. The pair of smaller projections 24-2, 24-3 presses the monofilament 19 to form the pair of interengaging head-side widened portions 6, 7 respectively. Each pair of projections 26, 26 are disposed to be apart from the smaller projections 24-2, 24-3. The pair of projections 26, 26 presses the monofilament 19 to form the pair of connecting portions 11, 12 respectively. On the other hand, along the external peripheral surface of the internal roller 23, a number of grooves 27, 27 are provided and correspond only the larger projections 24-1, 24-1 of the external roller 22. The synthetic resin monofilament 19 is pressed between the external roller 22 and the internal roller 23 so as to be the monofilament 19 shown in FIGS. 7 and 8. In this case, by the larger projection 24-1 of the external roller 22 and the groove 27 of the internal roller 23, as explained before, at the interengaging head 3, the monofilament 19 is pressed to be bent so that the interengaging head 3 is deeper than the interengaging head-side widened portions 6, 7. Further, the monofilament 19 is projected toward the opposite side to its pressed surface in order to attain the sure engagement of the opposed pair of coil-shaped fastener elements 1, 1 by keeping the predetermined interval between the upper and lower legs 4, 5.

In the above embodiment, the larger projection 24-1 and the smaller projections 24-2, 24-3 are provided on one stamping roller 21 so that the interengaging head 3 and the pair of interengaging head-side widened portions 6, 7 are formed with one stamping roller 21. However, the larger projection 24-1 and the smaller projections 24-2, 24-3 might be provided on two different stamping rollers respectively so that the interengaging head 3 and the pair of interengaging head-side widened portions 6, 7 are formed with the different stamping rollers respectively. The stamping roller 21 is preferably placed near the mandrel 20 for the precise and high-speed forming operation. However, pressing operation with the stamping roller 21 and winding operation with the mandrel 20 can be carried out respectively. In case that each interengaging head 3 is not formed with the stamping roller 21, after the monofilament 19 is wound around the mandrel 20, for example, the wound monofilament 19 might be pressed to form the interengaging head 3.

Figure 10A:
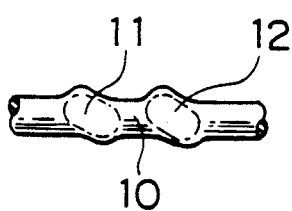
FIGS. 10-i and 10-ii are plan views of modified embodiment of turns.
Figure 8V:
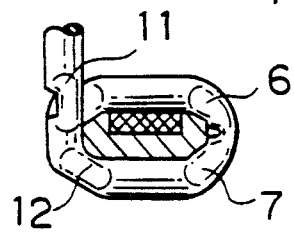
Figure 10B:
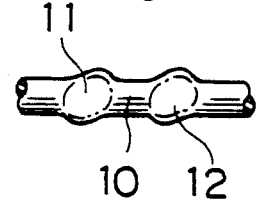

In each FIG. 10-i, 10-ii, the pair of connecting portions 11, 12 of the turn 10 are disposed so as to be inclined with respect to the longitudinal direction of the monofilament 19. In the opposed pair of coil-shaped slide fastener elements 1, 1, the monofilaments 19, 19 are wound in the directions of anticlockwise and clockwise respectively. In order to correspond these two winding directions, there are two inclining directions. As shown in FIG. 5, the turns 10, 10 are disposed so as be inclined to the fastener tape 2. Then, as shown in FIG. 10-i, the pair of connecting portions 11, 12 are formed by pressing the monofilament 19 so as to be inclined to the left side with respect to the longitudinal direction of the monofilament 19 for the anticlockwise winding direction. As shown in FIG. 10-ii, the pair of connecting portions 11, 12 are formed so as to be inclined to the right side for the clockwise winding direction. Consequently, the turn 10 is provided so as to correspond the winding direction of the coil-shaped slide fastener elements 1 in order to keep exact location of the turn 10.

In the above mentioned embodiment, each pair of interengaging head-side widened portions 6, 7 are formed to be continued to each interengaging head 3. However, in second embodiment, as shown in FIGS. 11~17, each pair of interengaging head-side widened portions 6a, 7a are formed separately with each interengaging head 3a. FIG. 11 shows a synthetic resin monofilament 19a of second embodiment. The monofilament 19a is pressed with a stamping roller. Then, the monofilament 19a is wound around the mandrel 20 to be coil-shaped slide fastener elements. In this second embodiment, as shown in FIG. 12, the pair of connecting portions 11, 12 are formed by pressing the monofilament 19a from the upper side of FIG. 12 of the monofilament 19a so that the pressed faces of the pair of pressed portions 13, 14 direct outside of the wound monofilament 19a. On the other hand, as shown in FIG. 12, the interengaging head 3a and the pair of interengaging head-side widened portions 6a, 7a are formed by pressing the monofilament 19a from the lower side of FIG. 12 of the monofilament 19a so that the pressed faces of pressed portions 8a, 9a direct inside of the wound monofilament 19a. That is to say, the pressed faces of the pair of pressed portions 8a, 9a and the pressed faces of the pair of pressed portions 13, 14 are opposite each other.

Due to the pair of widened portions 6a, 7a and the pair of connecting portions 11, 12, the bending portions of the monofilament 19a can be determined correctly. Accordingly, the advantages explained before can be obtained. Further, in this second embodiment, the pair of widened portions 6a, 7a are provided at the both sides of the interengaging head 3a so as to be separated from the interengaging head 3a respectively. Therefore, the monofilament 19a can be bent at the widened portions 6a, 7a while any deformation of the interengaging head 3a is not caused. Therefore, the predetermined interval between the upper and lower legs 4, 5 can be kept more exactly, thus, as explained before, a portion of interengaging head 3a of one coil-shaped slide fastener element can be engaged more surely between the upper and lower legs 4, 5 of the other coil-shaped slide fastener element. At the same time, as shown in FIG. 13, the interengaging head-side widened portions 6a, 6a, 7a, 7a of the opposed pair of coil-shaped slide fastener elements can be interengaged deeply until that turn-side faces of the opposed interengaging head-side widened portions 6a, 6a, 7a, 7a are brought into contact with each other. As a result, also in this second embodiment, the stable interengagement of the opposed pair of coil-shaped slide fastener elements can be ensured.

In this second embodiment, as explained above, the pressed faces of the pair of pressed portions 8a, 9a and the pressed faces of the pair of pressed portions 13, 14 are opposite each other. Accordingly, when the monofilament 19a is wound around the mandrel 20, as shown in FIG. 12, the pair of interengaging head-side widened portions 6a, 7a are disposed at the external side of the coil-shaped slide fastener elements. Therefore, as shown in FIGS. 13, 14, the interengaging head-side widened portions 6a, 6a, 7a, 7a of the opposed pair of coil-shaped slide fastener elements can be interengaged surely each other against the pulling force applied transversely to a slide fastener chain. Further, as shown in FIG. 17, when a force is applied to the slide fastener chain from underside of the opposed pair of fastener tapes 2, 2 in the direction indicated by the arrow of this figure, swing motions of the opposed pair of coil-shaped slide fastener elements about the interengaging heads 3a, 3a are suppressed. Then, disengagement of the opposed pair of coil-shaped slide fastener elements are prevented.

As shown in FIG. 16, the coil-shape slide fastener elements of second embodiment can be utilized also for the coil-shaped slide fastener elements where the core cord is not threaded as explained before referring to FIG. 6.

While preferred embodiments have been described, it is apparent that the present invention is not limited to the specific embodiments thereof.

What is claimed:

1. Slide fastener elements made of a helically wound synthetic resin monofilament with each slide fastener element comprising:

an interengaging head, which is formed to be arranged on oneline in the longitudinal direction of said slide fastener elements by pressing a monofilament to be widened at its portion corresponding to said interengaging head;

a pair of interengaging head-side widened portions, which are formed at the both upper and lower sides of said interengaging head respectively by pressing said monofilament at its portions adjacent to said interengaging head;

upper and lower legs, which extend from the both ends of said interengaging head through said pair of interengaging head-side widened portions respectively so as to transverse the longitudinal direction of said slide fastener elements;

a turn, which extends between an upper leg of one slide fastener element and a lower leg of an adjacent slide fastener element through pair of connecting portions; and said pair of connecting portions, which are formed at the both upper and lower sides of said turn respectively by pressing said monofilament to be widened at its portions adjacent to said turn.

2. Slide fastener elements according to claim 1, wherein each pair of interengaging head-side widened portions are disposed so as to be connected to each interengaging head.

3. Slide fastener elements according to claim 1, wherein each pair of interengaging head-side widened portions are disposed so as to be separated from each interengaging head.

4. A method of forming slide fastener elements made of a helically wound synthetic resin monofilament with each slide fastener element, which has an interengaging head, upper and lower legs extending from the both ends of said interengaging head respectively and a turn extending between an upper leg of one slide fastener element and a lower leg of an adjacent slide fastener element, comprising:

pressing a monofilament to be widened at its portion corresponding to said interengaging head which is arranged on oneline in the longitudinal direction of said slide fastener elements;

pressing said monofilament at its portions adjacent to said interengaging head to form a pair of interengaging head-side widened portions which are disposed between said interengaging head and said upper and lower legs respectively;

pressing said monofilament to be widened at its portions adjacent to said turn to form a pair of connecting portions which are disposed between said turn and said upper and lower legs respectively;

winding helically said monofilament into said slide fastener elements by using said pair of interengaging head-side widened portions and said pair of connecting portions as bending portions of said monofilament.

5. A method of forming slide fastener elements according to claim 4, wherein each pair of interengaging head-side widened portions are disposed so as to be connected to each interengaging head.

6. A method of forming slide fastener elements according to claim 4, wherein each pair of interengaging head-side widened portions are disposed so as to be separated from each interengaging head.

* * * * *